United States Patent [19]

Gulya et al.

[11] Patent Number: 5,071,697
[45] Date of Patent: Dec. 10, 1991

[54] STRUCTURE FOR EXTRACTING WATER FROM A PAPER WEB IN A PAPERMAKING PROCESS

[75] Inventors: Thomas G. Gulya; Michael C. Johnson, both of Appleton, Wis.

[73] Assignee: Appleton Mills, Appleton, Wis.

[21] Appl. No.: 468,222

[22] Filed: Jan. 22, 1990

[51] Int. Cl.⁵ .............................. B32B 5/02
[52] U.S. Cl. ........................ 428/234; 428/137; 428/138; 428/246; 428/247; 428/280; 428/282; 428/284; 428/286; 428/316.6
[58] Field of Search ............... 428/234, 246, 247, 282, 428/300, 137, 138, 304.4, 316.6, 284, 286

[56] References Cited

U.S. PATENT DOCUMENTS

| | | | |
|---|---|---|---|
| 3,059,312 | 10/1962 | Jamieson | 428/234 |
| 3,617,442 | 11/1971 | Hurschman | 162/212 |
| 3,772,746 | 11/1973 | Ivanowicz | 28/72.2 |
| 4,271,222 | 6/1981 | Hahn | 428/193 |
| 4,357,386 | 11/1982 | Luciano et al. | 428/234 |
| 4,369,081 | 1/1983 | Curry et al. | 428/234 |
| 4,446,187 | 5/1984 | Eklund | 428/138 |
| 4,469,740 | 9/1984 | Bailly | 428/234 |
| 4,636,424 | 1/1987 | Amemiya et al. | 428/316.6 |
| 4,701,368 | 10/1987 | Kiuchi et al. | 428/234 |
| 4,795,480 | 1/1989 | Boyer et al. | 428/282 |
| 4,830,905 | 5/1989 | Gulya et al. | 428/282 |
| 4,902,565 | 2/1990 | Brook | 428/316.6 |
| 4,961,974 | 10/1990 | Jones | 428/316.6 |

Primary Examiner—James J. Bell
Attorney, Agent, or Firm—Andrus, Sceales, Starke & Sawall

[57] ABSTRACT

A composite structure for extracting water from a wet paper web in a papermaking process. The structure includes a base or substrate and a layer of water permeable polymeric foam, such as polyurethane foam, is secured to a surface of the substrate and an outer web supporting layer of water permeable polymeric material is bonded to the outer surface of the foam layer. The outer polymeric layer provides a smooth web supporting surface having toughness and abrasion resistance.

12 Claims, 1 Drawing Sheet

FIG. 1
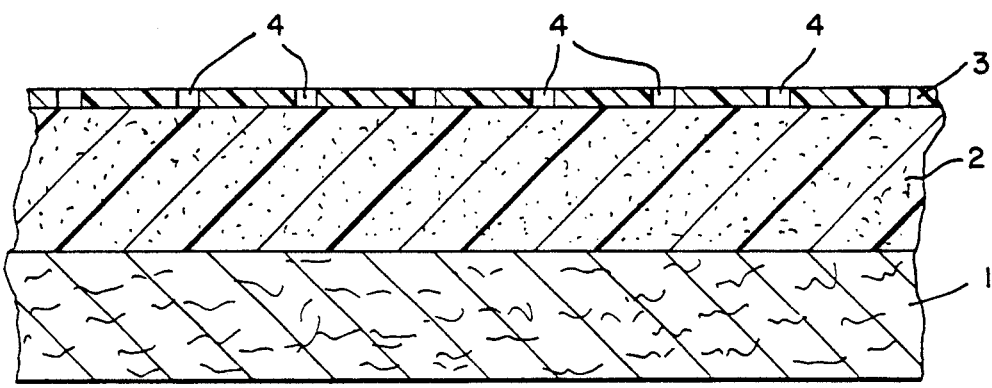
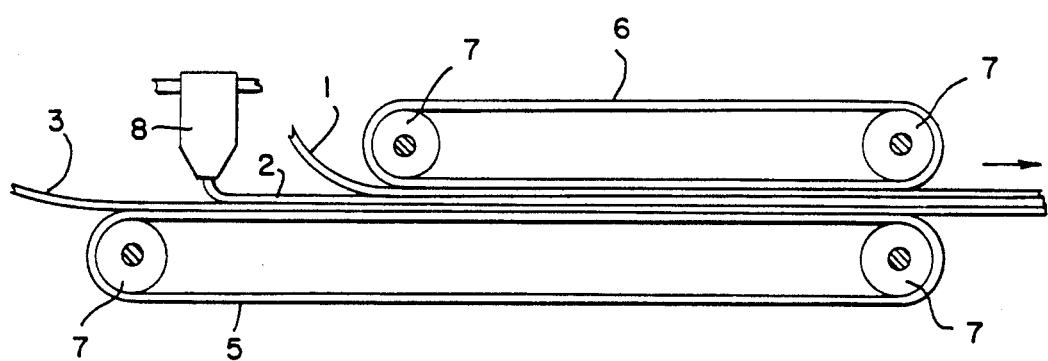
FIG. 2

STRUCTURE FOR EXTRACTING WATER FROM A PAPER WEB IN A PAPERMAKING PROCESS

BACKGROUND OF THE INVENTION

A papermaker's felt is used in the press section of a papermaking machine to support the paper web as the web is passed through the nip between a pair of cooperating press rolls to extract water from the web.

During endless travel of the felt in the press section of the papermaking machine, the web-supporting surface of the felt is normally passed in direct contact with one or more uhle boxes or suction boxes, and may also ride against supporting rolls, both of which can cause abrasion to the web supporting surface. Additional abrasion can be caused by slippage of the felt, such as slippage between the felt and the paper web, slippage between the felt and rolls, and slippage between two felts. Thus the web carrying surface of the felt must have a certain flexibility and toughness to withstand this abrasive action.

In addition, the felt is subjected to substantial compressive stress as it passes through the nip between the press rolls, and the web supporting surface of the felt must be resistant to the compressive stress to prevent tearing or rupture.

It has been proposed to utilize a polymeric foam material, such as polyurethane foam, as a web-supporting component in a felt. However, the foam layer, if skived to thickness, has an outer web-supporting surface which is too weak to resist abrasion and other dynamic forces to which the felt is exposed in the papermaking process so that the foam material tends to abrade and tear away in large pieces which are detrimental to the paper machine operation.

On the other hand, it is possible to form a polymeric foam layer with a relatively thick and rubbery surface skin, and while a skin of this type is capable of resisting abrasion, it lacks the necessary permeability to be used as a web-supporting surface in a papermaker's felt.

SUMMARY OF THE INVENTION

The invention is directed to a composite structure, such as a papermaker's felt, be used in a papermaking process for extracting water from a wet paper web. In accordance with the invention, the composite structure includes a base or substrate that can be formed of natural or synthetic materials either in a woven, unwoven, or extruded form.

A layer of water permeable polymeric foam, such as polyurethane foam, is secured to a surface of the substrate, and a thin outer layer of water permeable polymeric material is bonded to the outer surface of the foam layer.

The outer layer can be a latex or resin having a thickness generally in the range of 1 to 40 mils. The permeability for the outer layer can be achieved by preforming a sheet of the material with a mutliplicity of holes, or the outer layer can take the form of a latex or thermoplastic film having a natural, as-formed porosity. The outer layer provides a flexible, tough skin for the structure which will resist abrasion and tearing during service.

By preforming holes in the outer web-supporting layer, controlled permeability is obtained to provide more accurate control of the water extraction from the paper web.

The outer polymeric layer provides a smooth web supporting surface which will not mar the web and thus provides a better quality of product.

The controlled porosity of the outer web supporting layer also reduces backflow through the felt. By proper selection of the pore or hole size in the outer layer, flow transmission can be limited to as little as vapor when pressures are reduced below 20 psi, thus minimizing back flow of water into the web as the web and felt emerge from the nip.

Where a polymeric foam layer is employed as the web support, air is carried in the surface layer of the cells of the foam, and the air is pushed out under the paper web as the web and felt are converging in the nip which results in "blowing" of the sheet. As the felt structure of the invention has a relatively smooth outer surface or skin, there is less air carrying capacity, thereby minimizing "blowing" of the paper web.

Other objects and advantages will appear in the course of the following description:

DESCRIPTION OF THE DRAWINGS

The drawings illustrate the best mode presently contemplated of carrying out the invention.

In the drawings:

FIG. 1 is a transverse section showing the felt structure of the invention; and

FIG. 2 is a schematic drawing of the method of producing the felt structure.

DESCRIPTION OF THE ILLUSTRATED EMBODIMENT

FIG. 1 illustrates a composite structure to be used for supporting a wet paper web or sheet in a papermaking process, and has particular application as a felt in the press section of the papermaking machine.

As illustrated in FIG. 1, the structure includes a base or substrate 1 and a layer of water permeable, polymeric foam 2 is secured to a surface of the base. A thin, flexible, water permeable layer of polymeric material 3 is bonded to the outer surface of the foam layer 2.

Substrate 1 can be formed of synthetic or natural materials and may consist of woven fabric, non-woven or randomly oriented fibrous material, needled batt, or non-woven extruded synthetic mesh.

Foam layer 2 is preferably an open or reticulated cell structure composed of a multiplicity of interconnected cells. The foam layer can be formed of a material, such as a polyurethane foam. Alternately, the foam layer 2 can be constructed as described in U.S. Pat. No. 4,830,905 in which a closed cell foam is needled to the substrate 1, the needling acting to rupture the closed-cell structure to provide porosity for the foam layer.

The water permeable outer or skin layer 3 has a thickness in the range of 1 to 40 mils, and preferably in the range of 10 to 20 mils. Outer layer 3 can take the form of a latex or a crosslinkable thermoplastic resin such as nylon, polyvinylchloride, acrylic, polyurethane or the like.

The water porosity of outer layer 3 can be provided by forming a multiplicity of holes or pores 4, preferably in a regular patern, in a sheet or film of the polymeric material. Alternately, certain films such as latex and polyvinylchloride, as formed, are water permeable so that it is not necessary to punch or otherwise form holes in the material.

It is also contemplated that outer layer 3 can take the form of spun bonded synthetic fibers, such as polyethylene or polypropylene fibers.

Outer layer 3 is flexible and tough and serves to support the paper web as the web is passed through the nip between cooperating press rolls.

FIG. 2 represents schematically a manner of producing the felt structure of the invention. As shown in FIG. 2, a pair of conveyor belts 5 and 6 formed of fabric, plastic, or metal, are each mounted for endless travel on a series of rollers 7. As shown in FIG. 2, the lower conveyor belt 5 projects beyond the end of the upper belt 6.

Layer 3, which can be in the form of a sheet or film of the polymeric material having a multiplicity of preformed pores or holes, is fed from a roll or coil into the projecting end of conveyor belt 5. A mixing head 8 is located above the projecting end of belt 5 and a liquid foamable resin, such as polyurethane, is discharged from head 8 onto the upper surface of the sheet 3. After application of the foamable resin, the base or substrate 1 is applied to the upper surface of the foamable resin layer 2. The composite structure is then passed between the cooperating belts 5 and 6, and expansion or foaming of the liquid resin will cause the foam material to partially penetrate into the substrate, and to firmly bond to both the substrate and the layer 3. The belts 5 and 6 can be heated to accelerate reaction of the components of the foamable resin composition.

As an alternate method, a coating of a liquid thermoplastic resin or latex can be applied to the upper surface of a polymeric foam layer which is bonded to a substrate, and the latex will bond to the intermediate foam layer 2. However, this method requires accurate viscosity control of the resin or latex coating to prevent clogging of the cells of the foam with the liquid resin or latex.

The structure of the invention has particular use as a felt in the press section of a papermaking machine in which the wet paper web is supported on the outer layer 3, as the paper web passes through the nip between a pair of cooperating press rolls. The holes or pores 4 in the outer layer 3 serve to regulate the water flow through the felt, and it is preferred that the porosity of the outer layer 3 be slightly less than the porosity of the foam layer 2 and substrate 1, so that the outer layer 3 comprises the flow controlling component.

As the paper web and felt emerge from the nip and the compressive force is released, there is a tendency for water to be drawn back into the web from the felt. By proper selection of the size of pores 4, backflow of water at reduced pressure can be minimized or prevented.

The outer layer 3 has a relatively smooth surface which will not mar the paper web and will thus produce a more acceptable product.

As the outer layer 3 is flexible and tough, the felt structure is less susceptible to abrasion and tearing during use, thus providing a longer service life for the felt and correspondingly decreasing downtime of the papermaking machine.

Various modes of carrying out the invention are contemplated as being within the scope of the following claims particularly pointing out and distinctly claiming the subject matter of the invention:

We claim:

1. A structure to support a paper web in a papermaking process, comprising a substrate, a layer of water permeable polymeric foam having a first surface secured to said substrate, and a tough, flexible, thin outer layer of water permeable polymeric film bonded to a second surface of said foam layer and disposed to support a paper web in a papermaking process.

2. The structure of claim 1, wherein said outer layer has a thickness of 1 to 40 mils.

3. The structure of claim 1, wherein the outer layer is composed of a crosslinkable thermoplastic resin.

4. The structure of claim 1, wherein the outer layer is composed of spun bonded polymeric fibers.

5. The structure of claim 1, wherein said outer layer has a multiplicity of pores distributed in a regular pattern over the surface of the said outer layer.

6. The structure of claim 1, wherein said substrate comprises a needled fabric.

7. The structure of claim 1, wherein said substrate comprises a woven fabric.

8. The structure of claim 1, wherein said substrate comprises extruded synthetic mesh.

9. The structure of claim 1, wherein said foam layer comprises polyurethane foam having a multiplicity of interconnected cells.

10. A structure to support a paper web in a papermaking process as the structure and the web are subjected to a compressive stress to thereby extract water from said web and flow the extracted water through said structure, comprising a substrate, a layer of water permeable polymeric foam secured to a surface of the substrate and having a plurality of interconnected cells, and a flexible tough outer layer of water permeable polymeric material bonded to said foam layer and having a thickness in the range of 1 to 40 mils, said outer layer having a water permeability such that back flow of water from said structure to said web on release of said compressive stress is substantially prevented.

11. The structure of claim 10, wherein said outer layer comprises a sheet having a multiplicity of pores extending therethrough.

12. The structure of claim 10, wherein the water permeability of said outer layer is less than the water permeability of said foam layer.

* * * * *